United States Patent
Gopal et al.

(10) Patent No.: US 9,940,130 B2
(45) Date of Patent: *Apr. 10, 2018

(54) ROTATE INSTRUCTIONS THAT COMPLETE EXECUTION EITHER WITHOUT WRITING OR READING FLAGS

(71) Applicant: Intel Corporation, Santa Clara, CA (US)

(72) Inventors: Vinodh Gopal, Westborough, MA (US); James D Guilford, Northborough, MA (US); Gilbert M Wolrich, Framingham, MA (US); Wajdi K Feghali, Boston, MA (US); Erdinc Ozturk, Hillsboro, OR (US); Martin G Dixon, Portland, OR (US); Sean Mirkes, Beaverton, OR (US); Bret L Toll, Hillsboro, OR (US); Maxim Loktyukhin, Folsom, CA (US); Mark C Davis, Portland, OR (US); Alexandre J Farcy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,223

(22) Filed: Dec. 5, 2014

(65) Prior Publication Data

US 2015/0089200 A1    Mar. 26, 2015

Related U.S. Application Data

(63) Continuation of application No. 13/947,958, filed on Jul. 22, 2013, now Pat. No. 9,164,762, which is a (Continued)

(51) Int. Cl.
*G06F 9/30*    (2006.01)

(52) U.S. Cl.
CPC ...... *G06F 9/30032* (2013.01); *G06F 9/30094* (2013.01); *G06F 9/30098* (2013.01)

(58) Field of Classification Search
CPC ............. G06F 9/30032; G06F 9/30094; G06F 9/30098
See application file for complete search history.

(56) References Cited

U.S. PATENT DOCUMENTS

| | | |
|---|---|---|
| 4,433,390 A | 2/1984 | Carp et al. |
| 4,464,584 A | 8/1984 | Hentzschel et al. |

(Continued)

FOREIGN PATENT DOCUMENTS

| | | |
|---|---|---|
| CN | 1414469 A | 4/2003 |
| CN | 1423774 A | 6/2003 |

(Continued)

OTHER PUBLICATIONS

Intel Corporation. IA-32 Intel Architecture Software Developer's Manual, 2005, Intel Corporation.*

(Continued)

*Primary Examiner* — Benjamin Geib
(74) *Attorney, Agent, or Firm* — Nicholson, DeVos, Webster (57) ABSTRACT

A method of one aspect may include receiving a rotate instruction. The rotate instruction may indicate a source operand and a rotate amount. A result may be stored in a destination operand indicated by the rotate instruction. The result may have the source operand rotated by the rotate amount. Execution of the rotate instruction may complete without reading a carry flag.

22 Claims, 7 Drawing Sheets

Related U.S. Application Data continuation of application No. 12/655,213, filed on Dec. 26, 2009, now Pat. No. 8,504,807.

(56) References Cited

U.S. PATENT DOCUMENTS

| | | | |
|---|---|---|---|
| 4,551,841 A | | 11/1985 | Fujita et al. |
| 4,569,016 A | * | 2/1986 | Hao et al. ............... 712/224 |
| 4,716,521 A | | 12/1987 | Nagae |
| 4,788,661 A | | 11/1988 | Morita |
| 5,881,274 A | | 3/1999 | Ngo et al. |
| 5,906,002 A | | 5/1999 | Lee |
| 6,483,360 B2 | | 11/2002 | Nakamura |
| 7,185,180 B2 | * | 2/2007 | Henry ............... G06F 9/30094 712/218 |
| 7,373,514 B2 | | 5/2008 | Krueger et al. |
| 7,743,232 B2 | * | 6/2010 | Shen et al. ............. 712/211 |
| 7,743,235 B2 | | 6/2010 | Wolrich et al. |
| 7,840,783 B1 | * | 11/2010 | Singh et al. ............. 712/217 |
| 2009/0024836 A1 | | 1/2009 | Shen et al. |

FOREIGN PATENT DOCUMENTS

| | | |
|---|---|---|
| CN | 1438574 A | 8/2003 |
| CN | 1573685 A | 2/2005 |
| JP | 60-143360 A | 5/1985 |
| JP | 04-278638 A | 10/1992 |
| JP | 05-088887 B | 9/1993 |
| JP | 07-504282 A | 5/1995 |
| JP | 2009-282744 A | 12/2009 |
| TW | 200404257 A | 3/2004 |
| TW | 200912738 A | 3/2009 |
| WO | 93/10493 A1 | 5/1993 |
| WO | 1997/08608 A1 | 3/1997 |

OTHER PUBLICATIONS

Carlson and Jahnke, "Leveraging the Benefits of Symetric Multiprocessing (SMP) in Mobile Devices", Feb. 2009, Texas Instruments.*

Blake et al., "A Survey of Multicore Processors", Nov. 2009, IEEE.*

Office Action received for Taiwan Patent Application No. 099142779, dated Jan. 19, 2015, 9 pages of Taiwan Office Action and 1 page of English search report.

Office Action received for German Patent Application No. 102010054267.9, dated Nov. 10, 2014, 6 pages of English Translation and 6 pages of German Office Action.

Office Action received for German Patent Application No. 102010054267.9, dated Apr. 23, 2014, 10 pages of English Translation and 11 pages of German Office Action.

Non-Final Office Action received for U.S. Appl. No. 12/655,213, dated Aug. 9, 2012, 10 pages.

Notice of Allowance received for U.S. Appl. No. 12/655,213, dated Apr. 5, 2013, 6 pages.

Non-Final Office Action received for U.S. Appl. No. 13/947,958, dated Dec. 4, 2013, 9 pages.

Notice of Allowance received for U.S. Appl. No. 13/947,958, dated Dec. 31, 2014, 6 pages.

Notice of Allowance received for U.S. Appl. No. 13/947,958, dated Jun. 18, 2014, 6 pages.

Office Action received for Japanese Patent Application No. 2010-272961, dated Jul. 22, 2014, 1 pages of English Translation and 1 pages of Japanese Office Action.

Office Action received for Japanese Patent Application No. 2010-272961, dated Jan. 7, 2014, 3 pages of English Translation and 3 pages of Japanese Office Action.

Office Action received for Japanese Patent Application No. 2010-272961, dated May 7, 2013, 2 pages of English Translation and 1 pages of Japanese Office Action.

Office Action received for Japanese Patent Application No. 2010-272961, dated Oct. 30, 2012, 1 pages of English Translation and 1 pages of Japanese Office Action.

Notice of Grant received for Chinese Patent Application No. 201010623118.1, dated Jan. 6, 2015, 2 pages of English Translation and 2 pages of Chinese Notice of Grant.

Office Action received for Chinese Patent Application No. 201010623118.1, dated Aug. 14, 2014, 7 pages of English Translation and 6 pages of Chinese Office Action.

Office Action received for Chinese Patent Application No. 201010623118.1, dated Feb. 7, 2014, 5 pages of English Translation and 4 pages of Chinese Office Action.

Office Action received for Chinese Patent Application No. 201010623118.1, dated Mar. 25, 2013, 10 pages of English Translation and 9 pages of Chinese Office Action.

AMD, "Software Optimization Guide for AMD Family 10h Processors", Advanced Micro Devices, Publication 40546, Revision 3.09, Nov. 2008, 348 pages.

Software Optimization Resources, "Optimization manuals", 2009, pp. 1-5. retrieved from: http://www.agner.org./optimize.

Cavium Networks, "Nitrox II", 2000-2009, 1 page. Retrived from: http://www.cavium.com/processor_security_nitroxII.htm.

SPARC International, Inc., "The SPARC Architecture Manual, Version 8", , 1991, 1992, 295 pages.

Wikipedia, "UltraSPARC Cryptographic Performance", Ultra SPARC cryptographic accelerators, Jul. 8, 2008, 5 pages.

VIA Technologies, Inc., "VIA Nano Processor", 2008, pp. 1-15.

Anger Fog, "Optimization Manual 4 Instruction Tables", Copenhagen University College of Engineering, Software Optimization Resources, 1996, 262 pages.

Henry, G. G., "The VIA Isaiah Architecture", Centaur Technology, Inc., Jan. 2008, 12 pages.

Intel, "Intel Architecture Software Developer's Manual vol. 2: Instruction Set Reference," 1999, pp. 1-2 and 3-591-3-595.

Intel, "Intel Itanium Architecture Software Developer's Manual vol. 3: Instruction Set Reference," Jan. 2006, pp. 1-x and 3:697-3:700.

Dandamudi, S., "MIPS Assembly Language", Computer Organization, (Chapter 15), 2003, 33 pages.

David, G., "The Architect's Trap", Computer-programming-forum.com/26-Programming-language, 2000, 12 pages.

Dodge, N. B., "EE 2310—Introduction to Digital Systems", Lecture 14—MIPS Shift, Rotate, and Decision—Support Instructions, 2003, 34 pages.

IBM, "Assembler Language Reference for IBM AIX Version 3 for RISC System/6000", First Edition. Austin (USA): IBM, 1991, 21 pages.

Mashey, J.R., "Why 64-bit games?", Jun. 1996, 3 pages.

Nagele, K., "Das RISC/6000-System von IBM", In: Praxis der informations verarbeitung and Kommunikation, ISSN (Online) 1865-8342, vol. 14, Issue 1 (Jan 1991), pp. 17-25.

Notice of Allowance received for U.S. Appl. No. 13/947,958, dated May 26, 2015, 5 pages.

Non-Final Office Action received for U.S. Appl. No. 14/562,145, dated Jul. 30, 2015, 13 pages.

Non-Final Office Action received for U.S. Appl. No. 14/562,310, dated Jul. 31, 2015, 13 pages.

Office Action received for Japanese Patent Application No. 2014-214502, dated Aug. 18, 2015, 2 pages of English Translation and 2 pages of Japanese Office Action.

Final Office Action received for U.S. Appl. No. 14/562,145, dated Apr. 22, 2016, 12 pages.

Final Office Action received for U.S. Appl. No. 14/562,310, dated May 3, 2016, 12 pages.

Office Action received for Japanese Patent Application No. 2014-214502, dated Jun. 7, 2016, 2 pages of Office Action including 1 page of English Translation.

Notice of Allowance received for Taiwan Patent Application No. 104135844 ,dated Jul. 18, 2016, 4 pages of Taiwan Notice of Allowance including 1 page of English Translation of Search Report.

Office Action Received for Chinese Patent Application No. 201410680656.2, dated Aug. 23, 2016, 12 pages of Chinese Office Action.

(56) References Cited

OTHER PUBLICATIONS

Notice of Allowance received for Japanese Patent Application No. 2014-214502, dated Sep. 27, 2016, 1 page of Japanese Notice of Allowance.
Zhanjie,"64-bit processor and programming of the same", China Machine Press, Jan. 31, 2006, pp. 200-204.(1 Page of Brief English Translation of Cited Portion).
Office Action received for German Patent Application No. 102010064599.0, dated Jun. 22, 2015, 3 pages of German Office Action Only.
Office Action received for Chinese Patent Application No. 201410680656.2 dated Jul. 3, 2017, 12 pages of Chinese Office Action Only.
Arm, "Arm® Architecture Reference Manual", Arm® v7-A and Arm® v7-R edition, Copyright © 1996-1998, 2000, 2004-2008, pp. i-xii, A2-5-A2-6, A4-8-A4-10, A5-5, A6-33, A8-10-A8-11, A8-278-A8-283.
Dodge, N. B., "Lecture 14—MIPS Shift, Rotate, and Decision-Support Instructions", Shift and Rotate Instructions, 2003, 34 pages.
IBM, "Ibm :: Rs6000 :: Aix 3.0 :: SC23-2197-0 Assembler Language Reference Mar90", <https://archive.org/details/bitsavers_ibmrs6000ablerLanguageReferenceMar90_14671826> on Feb. 23, 2015, 485 pages.
Intel, "RCL/RCR/ROL/ROR—Rotate", Intel 80386, retrieved from <http://intel80386.com/386htm/RCL.htm> on Feb. 23, 2015, 3 pages.
Mashey, John R., "Why 64-bit games? (Was: Re: Speed, and its need . . . )", retrieved from <http://yarchive.net/comp/carry_bit.html> on Apr. 22, 2014, 3 pages.
David et al., "The Architect's Trap (was Object orientation without GC is nonsense)", Computer-programming-forum.com/26-Programming-language, retrieved on Apr. 22, 2014, 12 pages.
Intel, "Intel® 64 and IA-32 Architectures Software Developer's Manual", vol. 2A: Instruction Set Reference, A-M, Order No. 253666-032US, Sep. 2009, 814 pages.
Intel, "Intel Architecture Software Developer's Manual", vol. 2: Instruction Set Reference, Order No. 243192, 1999, 854 pages.
Intel, "Intel® 64 and IA-32 Architectures Software Developer's Manual", vol. 1: Basic Architecture, Order No. 253665-032US, Sep. 2009, 500 pages.
Office Action received for Chinese Patent Application No. 201510116867.8, dated Dec. 5, 2016, 13 pages of Chinese Office Action Only.
Microchip, "High-Performance ROM-Less Microcontrollers With External Memory Bus", Microchip Technology Inc., © 2001-2013, pp. 1-322.
Non-Final Office Action received for U.S. Appl. No. 14/562,145, dated Feb. 13, 2017, 18 pages.
Non-Final Office Action received for U.S. Appl. No. 14/562,310, dated Feb. 17, 2017, 19 pages.

\* cited by examiner

| 31 | | 0 | |
|---|---|---|---|
| | | AX | EAX |
| | | BX | EBX |
| | | CX | ECX |
| | | DX | EDX |
| | | | ESI |
| | | | EDI |
| | | | EBP |
| | | | ESP |

| 63 | 31 | 0 | |
|---|---|---|---|
| | | EAX | RAX |
| | | EBX | RBX |
| | | ECX | RCX |
| | | EDX | RDX |
| | | ESI | RSI |
| | | EDI | RDI |
| | | EBP | RBP |
| | | ESP | RSP |
| | | | R8 |
| | | | R9 |
| | | | R10 |
| | | | R11 |
| | | | R12 |
| | | | R13 |
| | | | R14 |
| | | | R15 |

FIG. 5

| INSTRUCTION | DESCRIPTION |
|---|---|
| RORX — Rotate Right Logical Without Affecting Flags | ROTATES BITS OF FIRST OPERAND RIGHT IMM8 TIMES WITHOUT AFFECTING ARITHMETIC FLAGS. INSTRUCTION DOES NOT READ OR WRITE ARITHMETIC FLAGS. DEFAULT OPERAND SIZE IS 32 BITS. 64-BIT OPERAND SIZE USES REX.W=1. PREFIX BYTE OF 66H BEFORE THIS INSTRUCTION WILL CAUSE #UD. INSTRUCTION DOES NOT AFFECT ANY ARITHMETIC FLAGS. |

*FIG. 6*

```
IF (OPERANDSIZE = 32)
    y ← imm8 AND 1FH;
    DEST ← (SRC >> y) | (SRC << (32-y));
ELSEIF (OPERANDSIZE = 64 )
    y ← imm8 AND 3FH;
    DEST ← (SRC >> y) | (SRC << (64-y));
ENDIF
```

ROTATE INSTRUCTIONS THAT COMPLETE EXECUTION EITHER WITHOUT WRITING OR READING FLAGS

The present application is a continuation of U.S. patent application Ser. No. 13/947,958, filed Jul. 22, 2013, entitled "ROTATE INSTRUCTIONS THAT COMPLETE EXECUTION WITHOUT READING CARRY FLAG," currently pending. U.S. patent application Ser. No. 13/947,958 is itself a continuation of U.S. patent application Ser. No. 12/655,213, filed on Dec. 26, 2009, now granted as U.S. Pat. No. 8,504,807. U.S. patent application Ser. No. 13/947,958 and U.S. patent application Ser. No. 12/655,213 are hereby incorporated herein by reference.

BACKGROUND

Field

Various different embodiments relate to instructions, methods of executing the instructions, execution units to execute the instructions, or devices incorporating such execution units. In particular, various different embodiments relate to rotate instructions for which execution completes without reading a carry flag, methods of executing the instructions, execution units to execute the instructions, or devices incorporating such execution units.

Background Information

Rotate instructions are commonly included in instruction set architectures (ISAs). The rotate instructions allow devices to rotate data.

One known rotate instruction is the ROR—Rotate Right instruction. The ROR instruction is described in the Intel Architecture Software Developer's Manual, Volume 2: Instruction Set Reference, Order Number: 243192, 1999.

In addition to causing rotation, the ROR instruction also reads the carry flag. Reading such an arithmetic flag tends to take additional time. Moreover, the need to read the carry flag may tend to increase serialization, which may tend to limit parallel processing and/or speculative execution.

Moreover, the ROR instruction also overwrites a source operand with a destination operand. The source operand is destroyed upon completion of execution of the ROR instruction. In some applications, additional data movement instructions or operations may be needed to preserve the source operand. These data movement instructions or operations tend to take additional time.

Due to the importance of quickly and efficiently processing data, new and different rotate instructions would be useful.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details, such as instruction implementation specifics, data types, register types, register arrangements, processor types, system configurations, and the like, are set forth. However, it is understood that embodiments of the invention may be practiced without these specific details. In other instances, well-known circuits, structures and techniques have not been shown in detail in order not to obscure the understanding of this description.

Embodiments pertain to an instruction processing apparatus having an execution unit to execute a rotate instruction and complete execution of the rotate instruction without reading a carry flag.

Figure 1:
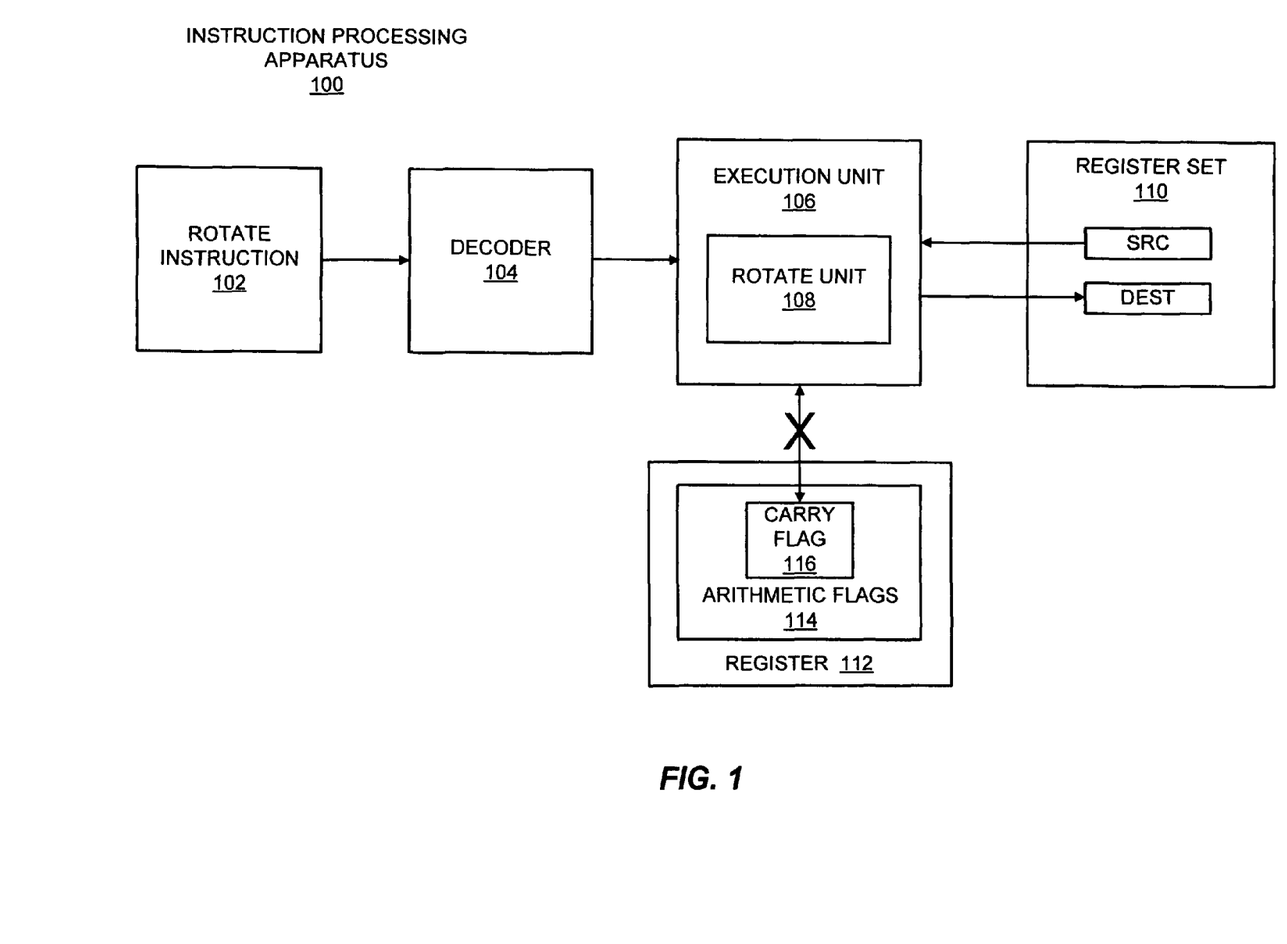
FIG. 1 is a block diagram of an example embodiment of an instruction processing apparatus.

FIG. 1 is a block diagram of an example embodiment of an instruction processing apparatus 100. In one or more embodiments, the instruction processing apparatus may be a general-purpose processor. The processor may be any of various complex instruction set computing (CISC) processors, various reduced instruction set computing (RISC) processors, various very long instruction word (VLIW) processors, various hybrids thereof, or other types of processors entirely. In one or more embodiments, the processor may be a general-purpose processor of the type manufactured by Intel Corporation, of Santa Clara, Calif., although this is not required. Specific examples of general-purpose processors available from Intel Corporation include, but are not limited to, Intel® Core™ i7 processor Extreme Edition, Intel® Core™ i7 processor, Intel® Core™ i5 processor, Intel® Core™ 2 Extreme processor, Intel® Core™ 2 Quad processor, Intel® Core™ 2 Duo processor, Intel® Pentium® processor, and Intel® Celeron® processor.

Alternatively, the instruction processing apparatus may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors entirely.

In still other embodiments, the instruction processing apparatus may be a controller (e.g., a microcontroller), or other type of logic circuit capable of processing instructions. In still further embodiments, the instruction processing apparatus may be an instruction executing cryptographic circuit.

Referring again to FIG. 1, during use the instruction processing apparatus may receive an embodiment of a rotate instruction 102. By way of example, the rotate instruction may be received from a memory or from software. The rotate instruction may represent a machine instruction or control signal that is recognized by the instruction processing apparatus. The instruction processing apparatus may have specific or particular circuitry or other logic (e.g., software combined with hardware and/or firmware) that is operable to perform a rotate operation on data in response to and/or as specified by the rotate instruction and store a rotated result in response to, or as a result of, the machine instruction.

The illustrated embodiment of the instruction processing apparatus includes an instruction decoder 104. The decoder may receive and decode the rotate instruction. The decoder may generate and output one or more micro-operations, micro-code entry points, microinstructions, other instructions, or other control signals, which reflect, or are derived from, the original rotate instruction. The decoder may be implemented using various different mechanisms. Examples of suitable mechanisms include, but are not limited to, microcode read only memories (ROMs), look-up tables, hardware implementations, programmable logic arrays (PLAs), and the like.

The decoder is not a required component of the apparatus. In one or more other embodiments, the apparatus may instead have an instruction emulator, an instruction translator, an instruction morpher, an instruction interpreter, or other instruction conversion logic. Various different types of instruction emulators, instruction morphers, instruction translators, and the like, are known in the arts. The instruction conversion logic may receive the rotate instruction, emulate, translate, morph, interpret, or otherwise convert the rotate instruction, and output one or more instructions or control signals corresponding to the original rotate instruction. The instruction conversion logic may be implemented in software, hardware, firmware, or a combination thereof. In some cases, some or all of the instruction conversion logic may be located off-die with the rest of the instruction processing apparatus, such as a separate die or in a system memory. In some cases, the instruction processing apparatus may have both the decoder and the instruction conversion logic.

Referring again to FIG. 1, the instruction processing apparatus includes an execution unit 106. By way of example, the execution unit may include an arithmetic logic unit, or another type of logic unit capable of performing rotation operations. The execution unit includes a rotate unit 108. Different types of rotation units, such as barrel rotators, are known in the arts. The invention is not limited to any known type of rotation circuit or unit.

In the illustrated embodiment, the execution unit is coupled with, or otherwise in communication with, an output of the decoder. The term "coupled" may mean that two or more elements are in direct electrical contact or connection. However, "coupled" may also mean that two or more elements are not in direct connection with each other, but yet still co-operate or interact with each other (e.g., through an intervening component). As one example, the decoder and the execution unit may be coupled with one another through an intervening optional buffer or other component(s) known in the arts to possibly be coupled between a decoder and an execution unit. As a result of the decoder decoding the rotate instruction, the execution unit may receive one or more micro-operations, micro-code entry points, microinstructions, other instructions, or other control signals, which reflect, or are derived from, the rotate instruction. Alternatively, the execution unit may receive and execute instructions or control signals from the aforementioned instruction conversion logic.

In one or more embodiments, the execution unit may be operable as a result of the rotate instruction 102 indicating a source operand (SRC) and a rotate amount to store a result in a destination operand (DEST) indicated by the rotate instruction, in which the result has the source operand rotated by the rotate amount. In one or more embodiments, the rotate instruction may be a rotate right instruction, which may rotate the data to the right. Bits rotated out of the least significant bit (LSB) may be rotated or wrapped back in through the most significant bit (MSB). Alternatively, the rotate instruction may be a rotate left instruction. During the rotation the data is not lost but rather just rotated or rearranged. The execution unit may include circuitry or other execution logic (e.g., software combined with hardware and/or firmware) operable to execute the instructions or other control signals derived from the rotate instruction and perform a rotation operation of the rotate amount on the source operand.

The rotate instruction may implicitly indicate and/or explicitly specify (e.g., through one or more dedicated fields or sets of bits) the source and destination operands and the rotate amount. Examples of suitable sources of the operands and the rotate amount include registers, memory, immediates of the instruction, and combinations thereof. In various embodiments, the source and destination operands may be 16-bit, 32-bit, or 64-bit operands, although this is not required.

In one or more embodiments, some or all of the source and destination operands may be stored in registers of a register set 110. The register set may be part of a register file, along with potentially other registers, such as status registers, flag registers, etc. The register may be a storage location or device that may be used to store data. The register set may often be physically located on die with the execution unit. The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

Referring again to the illustration, the processor or other instruction execution apparatus may include a plurality of arithmetic flags 114. The arithmetic flags include at least a carry flag 116. In one or more embodiments, the flags may be included in a register 112, such as a status register, a flags register, or a condition code register (CCR).

Processors and various other types of logic devices often utilize arithmetic flags. The flags may include one or more bits, often in a register. The flags don't have to be bits in a register. A flag may include a flip-flop circuit. A bit flag may store a binary value, such as a binary one or a binary zero. A plurality of bits may store a sequence of binary values or a code. Such binary values, or sequences of binary values, may represent different values of the flag. These different values of the flag may have an assigned or understood meaning to the processor or other logic device. The flags may be used for various different purposes. In some cases, the flags may be used to record a status, state, condition, or outcome of operations within the processor or other logic device.

A carry flag is a well-known type of arithmetic flag that is commonly found in processors and other logic devices.

The carry flag may be used to indicate whether or not there is overflow in arithmetic operations. For example, the carry flag may have a first value if there is overflow during a prior calculation, or the carry flag may have a second value if there is no such overflow. The carry flag may be used to indicate that an arithmetic operation has generated a result that is greater in magnitude than the number of bits in a given register or storage location can represent. For example, in one or more embodiments, the carry flag may be a single bit that may be set to 1 if an arithmetic operation generates a carry or borrow out of the most-significant bit of the result, and the carry flag may otherwise be set to 0. The carry flag is often utilized in arithmetic operations, such as addition and subtraction.

In one or more embodiments, the arithmetic flags may also include an overflow flag. An overflow flag is another well-known type of arithmetic flag that is commonly found in processors and other logic devices. The overflow flag is often a single bit in a register. The overflow flag roughly corresponds to a signed version of the carry flag. The overflow indicates when an arithmetic overflow has occurred in an operation. The overflow flag is set when the most significant bit (MSB) is set or cleared. The overflow flag may be set if a result is too large a positive number, or is too small a negative number, to fit in a destination operand. The overflow flag may be used to indicate that a previous operation resulted in a signed number whose sign was inconsistent with signs of operands that produced it. For example, the overflow flag may be set when the addition of two positive numbers produces a negative result, or when the addition of two negative numbers produces a positive result. It is not really important to fully understand in detail the functions and uses of the carry flag and the overflow flag in order to understand the embodiments disclosed herein.

In one or more embodiments, the arithmetic flags may also include one or more other types of arithmetic flags. Other arithmetic flags that are sometimes included in processors or certain other logic devices include a sign flag, a zero flag, an auxiliary carry flag, or a parity flag, or a combination thereof. Not all of such flags are included in all processors or other logic devices. Additionally, different names are sometimes used for these different flags.

In one or more embodiments, the execution unit may be operable to complete execution of the rotate instruction without reading the carry flag. This is shown conceptually by the large "X" through the arrow in the illustration.

In one or more embodiments, the execution unit may be operable to complete execution of the rotate instruction without reading an overflow flag. In one or more embodiments, the execution unit may be operable to complete execution of the rotate instruction without writing the carry or overflow flags. In one or more embodiments, the execution unit may be operable to complete execution of the rotate instruction without reading any of the carry flag, the overflow flag, a sign flag, a zero flag, an auxiliary carry flag, or a parity flag. In one or more embodiments, the execution unit may be operable to complete execution of the rotate instruction without either reading or writing any of the carry flag, the overflow flag, the sign flag, the zero flag, the auxiliary carry flag, or the parity flag. In one or more embodiments, the execution unit may be to complete execution of the rotate instruction without either reading or writing any arithmetic flags. Alternatively, in one or more embodiments, the execution unit may be operable to write all of the arithmetic flags without reading any of the arithmetic flags.

To avoid obscuring the description, a relatively simple instruction processing apparatus has been shown and described. It is to be appreciated that other embodiments may have a plurality of execution units. For example, the apparatus may include multiple different types of execution units, such as, for example, logic units, arithmetic logic units (ALUs), arithmetic units, integer units, etc. At least one of these units may be responsive to an embodiment of rotate instruction as disclosed herein. Still other embodiments may have multiple cores, logical processors, or execution engines. An execution unit operable to execute a rotate instruction as disclosed herein may be included within at least one, at least two, most, or all of the cores, logical processors, or execution engines.

The instruction processing apparatus may also optionally include one or more other well-known components. For example, other embodiments may optionally include instruction fetch logic, pre-decode logic, scheduling logic, re-order buffers, branch prediction logic, retirement logic, register renaming logic, and the like, or some combination thereof. These components may be implemented conventionally, or with minor adaptations that would be apparent to those skilled in the art based on the present disclosure. Further description of these components is not needed in order to understand the embodiments herein, although further description is readily available, if desired, in the public literature. There are literally numerous different combinations and configurations of such components known in the arts. The scope of the invention is not limited to any known such combination or configuration. Embodiments may be implemented either with or without such additional components.

Figure 2:
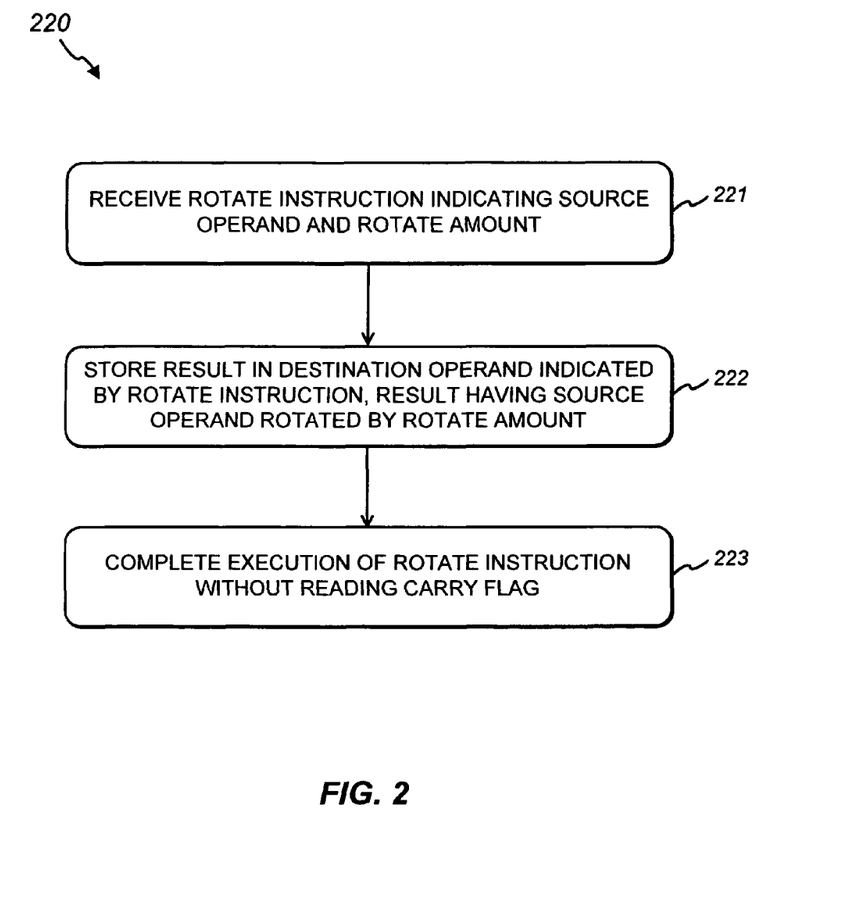
FIG. 2 is a block flow diagram of an embodiment of a method of processing an embodiment of a rotate instruction.

FIG. 2 is a block flow diagram of an embodiment of a method 220 of processing an embodiment of a rotate instruction. In various embodiments, the method may be performed by a general-purpose processor, a special-purpose processor (e.g., a graphics processor or a digital signal processor), a hardware accelerator (e.g., a cryptographic accelerator), or another type of logic device or instruction processing apparatus.

A rotate instruction may be received, at block 221. The rotate instruction may indicate a source operand and a rotate amount.

A result may be stored in a destination operand indicated by the rotate instruction, at block 222. The result may have the source operand rotated by the rotate amount.

Execution of the rotate instruction may complete, at block 223. In one or more embodiments, the execution of the rotate instruction may complete without reading a carry flag.

In one or more embodiments, the execution unit may be operable to complete execution of the rotate instruction without reading an overflow flag. In one or more embodiments, the execution unit may be operable to complete execution of the rotate instruction without writing the carry or overflow flags. In one or more embodiments, the execution unit may be operable to complete execution of the rotate instruction without reading any of the carry flag, the overflow flag, a sign flag, a zero flag, an auxiliary carry flag, or a parity flag. In one or more embodiments, the execution unit may be operable to complete execution of the rotate instruction without either reading or writing any of the carry flag, the overflow flag, the sign flag, the zero flag, the auxiliary carry flag, or the parity flag. In one or more embodiments, the execution unit may be to complete execution of the rotate instruction without either reading or writing any arithmetic flags. Alternatively, in one or more embodiments, the execution unit may be operable to write all of the arithmetic flags without reading any of the arithmetic flags.

Completing execution of the rotate instruction without reading the carry flag, or in some cases without reading either the carry flag or the overflow flag, or in some cases without reading any arithmetic flags, may help to increase the speed of execution of the rotate instruction. Reading the carry flag takes time. Moreover, even when read the carry flag and the other arithmetic flags are often not used by the rotate instruction. Accordingly, since reading these flags takes time, and since often these flags are not used, the speed of execution of the rotate instruction may be increased by not reading the carry flag and/or the carry flag and one or more other flags.

In addition, completing execution of the rotate instruction without reading the carry flag, or in some cases without reading either the carry flag or the overflow flag, or in some cases without reading any arithmetic flags, may also help to reduce serialization due to flag dependencies. Reducing such serialization may allow parallel processing, out-of-order execution, and/or speculative execution to be better exploited, which may help to increase the speed of many algorithms.

Rotate instructions are often included in algorithms with other instructions that modify the flags. For example, rotate instructions are often included in algorithms with logical instructions, such as AND instructions, XOR instructions, and the like. Such logical instructions commonly update the flags. The know ROR instruction may read the flags, and may therefore have a dependency on the flags. As a result, the ROR instruction may need to wait for execution of a preceding logical instruction to complete before it can execute, or at least fully execute. This may tend to serialization due to the flag dependencies. Note that this is not due to data dependencies, but rather due to flag dependencies. Some algorithms, such as, for example, hashing and cryptographic algorithms, tend to use relatively large proportions of both logical and rotate instructions. Accordingly, the amount of flag dependent serialization in such algorithms may be relatively high.

Such serialization may tend to hinder parallel processing, out-of-order execution, and/or speculative execution. For example, an out-of-order machine may not be able to execute the known ROR instruction before the logical instruction, even though there may be no data dependencies. This may tend to slow the execution of these algorithms.

However, as discussed above, in one or more embodiments, the rotate instruction may complete without reading the carry flag, or in some cases without reading either the carry flag or the overflow flag, or in some cases without reading any arithmetic flags. This may help to reduce the dependency on the flag or flags, which may help to reduce serialization in algorithms where the rotate instruction is used along with logical or other instructions that modify the flags. As a result, greater advantage may be taken of parallel processing, out-of-order execution, and/or speculative execution. This may tend to increase the speed and/or efficiency of hashing, cryptographic, and other algorithms.

In one or more embodiments, a rotate instruction may have operand definitions that further help to increase the speed of execution of various algorithms. Recall that the known ROR instruction causes the source operand to be overwritten with the destination operand. As a result, unless the source operand is moved (e.g., with a MOV or other move instruction), or otherwise preserved, execution of the ROR instruction will cause the source operand to be overwritten with the destination operand. In other words, the source operand will be destroyed. However, in some algorithms, the source operand may be needed beyond the execution of the rotate instruction. Accordingly, these algorithms often include additional MOV or other move instructions, or other types of instructions to preserve the source operand. In extreme cases, the number of such additional instructions can be quite significant. These additional instructions need to be decoded, potentially buffered, and executed.

In one or more embodiments, a rotate instruction may explicitly specify a source operand and explicitly specify a destination operand. Advantageously, this may allow different registers or other storage locations to be explicitly specified for the source and destination operands to prevent the source operand from being overwritten with the destination operand. Consequently, both the source and destination operands may be available upon completion of the rotate instruction. This may have several possible advantages. For one thing, this may help to avoid a data movement instruction, or other type of instruction to preserve the source operand. Advantageously, this may help to reduce the number of instructions that need to be decoded, potentially buffered, and executed. For another thing, if a decoded stream buffer (DSB) or the like is to be used, reducing the number of instructions may help to allow a loop of decoded instructions to fit within the DSB. Advantageously, this may help to increase processing speed by avoiding speed limiting decoding operations.

Two areas where rotate instructions tend to be used heavily are hashing and cryptography. Over the past several years, there has been a significant increase in the use of both hashing and cryptography. Increasingly more Internet and other network transactions are being cryptographically secured. As a result, dedicated cryptographic accelerators, embedded cryptographic processors, servers supporting many connections, and the like, may perform such cryptographic algorithms very frequently. Accordingly, the performance of these devices may be significantly affected by the speed and/or efficiency at which they are able to perform these cryptographic algorithms. Desktop and laptop computers, and other devices, although perhaps less frequently, are also asked to perform such cryptographic algorithms. In addition, the proportion of rotate instructions in certain hashing and cryptographic algorithms tends to be relatively high. For example, in some hashing and cryptographic algorithms about 10% or more of the instructions may be rotate instructions. As a result, improving the speed of execution of the rotate instruction may have a significant impact on the overall speed of execution of the algorithm. Of course the rotate instructions have a wide variety of other uses beyond hashing and cryptography (e.g., data compression, decompression, data scrambling, descrambling, etc.)

Turning now to the rotate amount, various different embodiments of rotate instructions may specify the rotate amount in various different ways. In one or more embodiments, the rotate instruction may indicate or specify the rotate amount through an immediate. The immediate may represent an operand that is directly encoded as part of or contained in the rotate instruction. An immediate byte value is often represented by imm8.

As another option, in one or more embodiments, the rotate instruction may implicitly indicate a second source operand having the rotate amount. For example, the rotation amount may be stored in an implicit register or other storage location. In one particular example embodiment, the implicit register may be the general-purpose register referred to as CL.

As yet another option, in one or more embodiments, the rotate instruction may explicitly specify a second source operand, such as a register, having the rotate amount. For example, in one or more embodiments, the rotate instruction may optionally use a VEX encoding. The VEX encoding may allow the instruction to explicitly specify an additional operand. As one particular example, the rotate instruction may specify the operation DEST=ROTATE (SRC by SRC2). Further description of VEX, if desired, is available in Intel® 64 and IA-32 Architectures Software Developer's Manual Volume 2A: Instruction Set Reference, A-M, Order Number: 253666-032US, September 2009.

Figure 3:
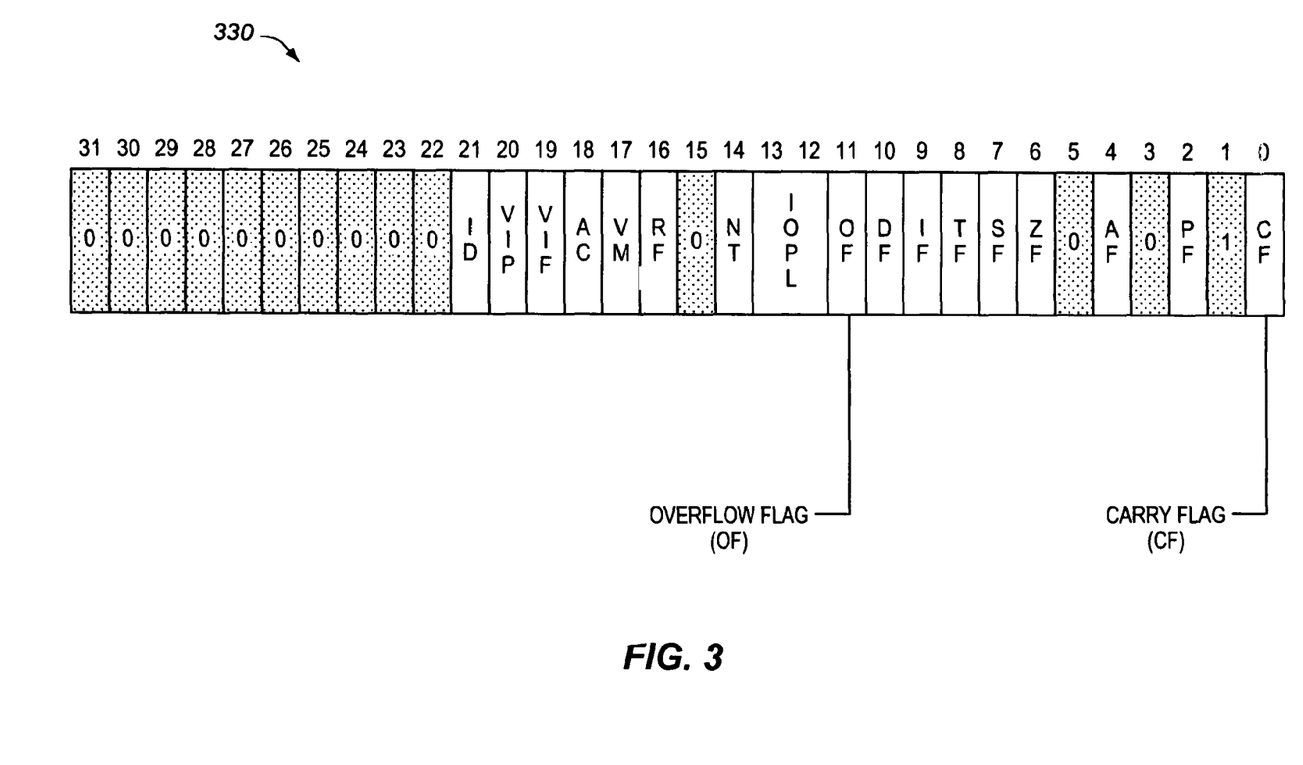
FIG. 3 illustrates an EFLAGS register representing a particular example embodiment of a suitable flags register and having a carry flag (CF) and an overflow flag (OF).

FIG. 3 illustrates an EFLAGS register 330 representing one particular embodiment of a suitable flags register. This particular register and these particular flags are certainly not required.

The EFLAGS register is a 32-bit register that includes a group of status flags, a control flag, and a group of system flags. The status flags include a carry flag (CF, bit 0), a parity flag (PF, bit 2), an auxiliary carry flag (AF, bit 4), a zero flag (ZF, bit 6), a sign flag (SF, bit 7), and an overflow flag (OF, bit 11).

The system flags include a trap flag (TF, bit 8), an interrupt enable flag (IF, bit 9), an I/O privileged level (IOPL, bits 12-13), a nested task (NT, bit 14), a resume flag (RF, bit 16), a virtual-8086 mode (VM, bit 17), an alignment check (AC, bit 18), a virtual interrupt flag (VIF, bit 19), a virtual interrupt pending (VIP, bit 20), and an ID flag (ID, bit 21). The control flag includes a direction flag (DF, bit 10). Bits 22-31 of EFLAGS are reserved.

The EFLAGS register is the successor to an earlier 16-bit FLAGS register. Additionally, the EFLAGS register, in 64-bit mode processors, has been succeeded and extended to 64-bits by an RFLAGS register. The lower 32-bits of RFLAGS is the same as EFLAGS. In each of the FLAGS, EFLAGS, and RFLAGS registers, the carry flag (CF) is bit 0 and the overflow flag (OF) is bit 11. Additional description of the EFLAGS/RFLAGS registers, and the carry flag, if desired, is available in Intel® 64 and IA-32 Architectures Software Developer's Manual, Volume 1: Basic Architecture, Order Number: 253665-032US, September 2009.

In one or more embodiments, the rotate instruction may indicate a source operand and/or a destination operand in a general-purpose register set. To further illustrate certain concepts, example embodiments of suitable general-purpose registers available in various x86 architecture processors will be discussed, although these particular registers certainly are not required.

Figure 4:
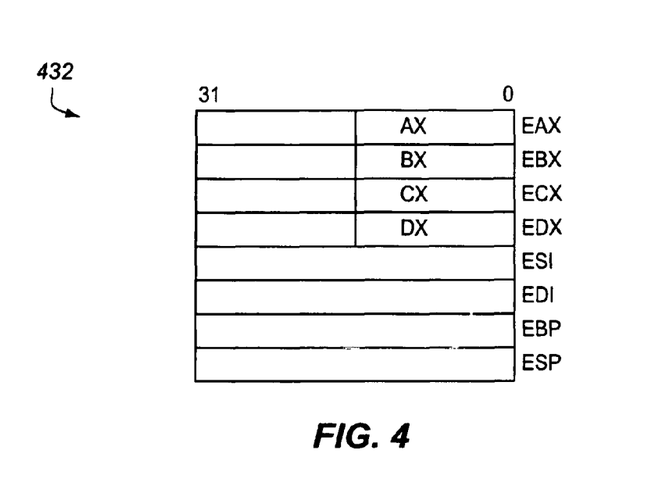
FIG. 4 illustrates one particular example embodiment of a suitable 32-bit general-purpose register set.

FIG. 4 illustrates one particular example embodiment of a suitable 32-bit general-purpose register set 432. The 32-bit register set includes eight 32-bit or doubleword general-purpose registers. These registers are referred to as EAX, EBX, ECX, EDX, ESI, EDI, EBP, and ESP. These 32-bit registers are also addressable in 16-bit and 8-bit modes. The lower 16 bits of the EAX, EBX, ECX, and EDX registers are referred to as AX, BX, CX, and DX, respectively. By way of example, word unsigned integers having 16-bits may be stored in the registers BX, CX, and DX, respectively. Doubleword unsigned integers having 32-bits may be stored in the registers EAX, EBX, ECX, EDX, ESI, EDI, EBP, ESP, R8D-R15D.

Figure 5:
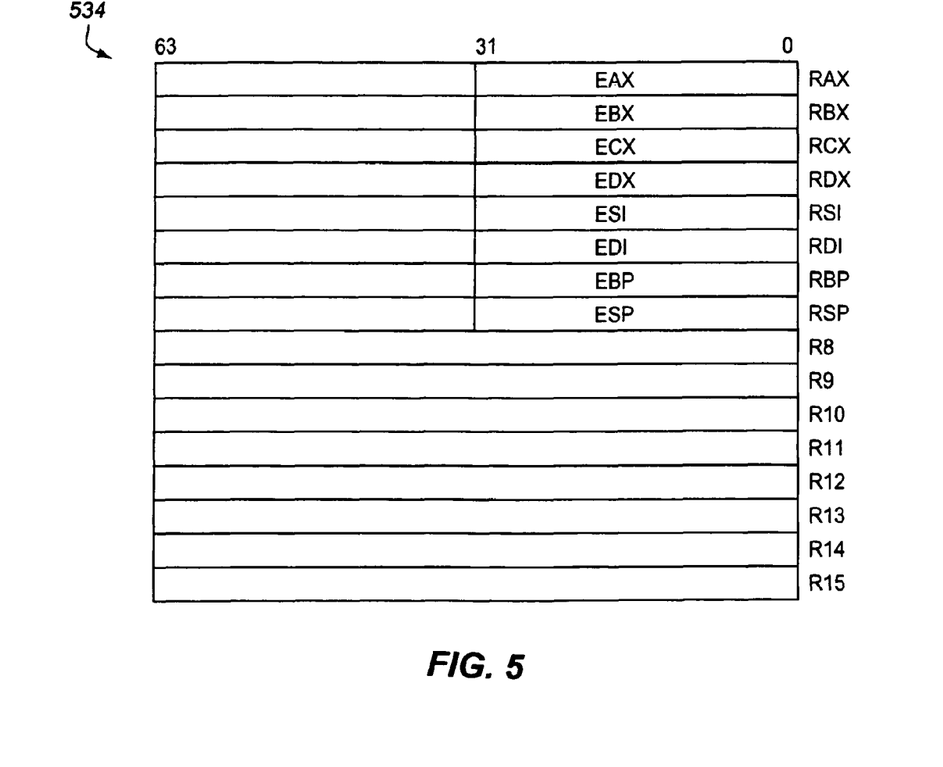
FIG. 5 illustrates another particular example embodiment of a suitable 64-bit general-purpose register set.

FIG. 5 illustrates another particular example embodiment of a suitable 64-bit general-purpose register set 534. The 64-bit register set includes sixteen 64-bit or quadword general-purpose registers. These registers are referred to as RAX, RBX, RCX, RDX, RSI, RDI, RBP, RSP, R8, R9, R10, R11, R12, R13, R14, and R15. These registers are operable in 32-bit mode on 32-bit operands, and operable in 64-bit mode on 64-bit operands. The lower 32-bits of the RAX, RBX, RCX, RDX, RSI, RDI, RBP, and RSP registers respectively correspond to the EAX, EBX, ECX, EDX, ESI, EDI, EBP, and ESP registers. The lower 32-bits of the registers R8-R15 are also addressable in 32-bit mode and are referred to by R8D-R15D. By way of example, quadword Unsigned integers having 64-bits may be stored in the registers RAX, RBX, RCX, RDX, RSI, RDI, RBP, RSP, or R8-R15.

Additional description of the general-purpose registers, if desired, is available in Intel® 64 and IA-32 Architectures Software Developer's Manual, Volume 1: Basic Architecture, Order Number: 253665-032US, September 2009. These particular registers are examples only, and are not required.

A rotate instruction, according to one particular example embodiment, is a RORX—Rotate Right Logical Without Affecting Flags instruction. The RORX instruction is a two-operand instruction, with both of the operands being explicit operands. The instruction operand encoding for the RORX instruction is shown in Table 1.

TABLE 1

RORX Operand Encoding

| Operand1 | Operand2 | Operand3 | Operand4 |
|---|---|---|---|
| ModRM:reg (W) | ModRM:r/m (R) | NA | NA |

Operand1 is explicitly specified and may be in the 32-bit general-purpose registers (reg) for the 32-bit mode instruction, or in the 64-bit general-purpose registers for the 64-bit mode instruction. Write (W) is allowed for Operand1.

Operand2 is explicitly specified and may be in the 32-bit general-purpose registers (r), or memory (m), for the 32-bit mode instruction, or in the 64-bit general-purpose registers, or memory, for the 64-bit mode instruction. Read (R) is allowed for Operand2.

Operand3 and Operand4 are not available for RORX. RORX has an immediate byte (imm8) to specify the rotate amount.

Figure 6:
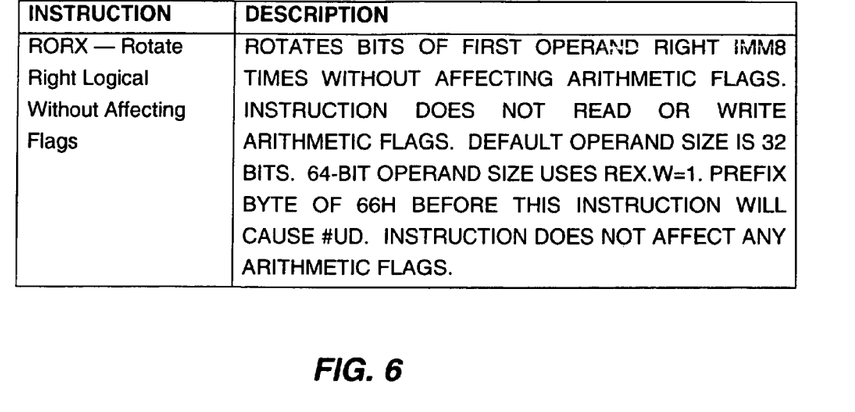
FIG. 6 shows a description of a RORX instruction representing a particular example embodiment of a rotate instruction.

FIG. 6 shows a description of a RORX instruction representing a particular example embodiment of a rotate instruction. 16-bit operand size is not presently encodable, although it is possible.

Figure 7:
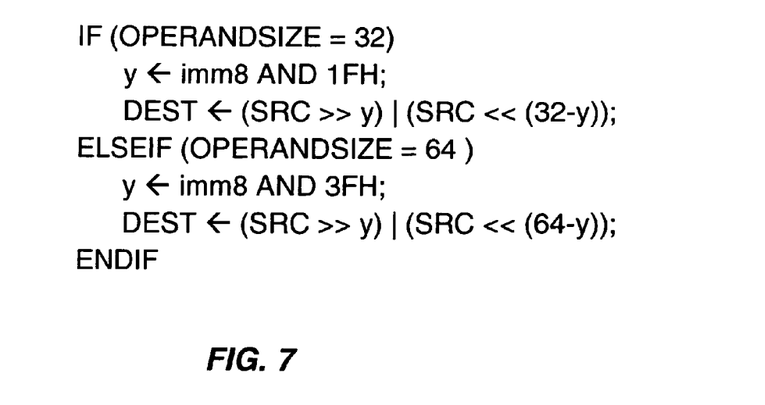
FIG. 7 shows operation in pseudocode of a RORX instruction representing a particular example embodiment of a rotate instruction.

FIG. 7 shows operation in pseudocode of a RORX instruction representing a particular example embodiment of a rotate instruction. SRC refers to the explicitly specified source operand, DEST refers to a destination operand, imm8 refers to an immediate byte used to specify the rotate amount, the symbol ">>" means shift right, the symbol "<<" means shift left, the symbol "|" means bitwise OR. This shows how the rotate can be considered two shifts.

No flags are affected by RORX. There are no SIMD floating point exceptions for RORX. Further description of opcodes, encoding, REX, and VEX prefixes, if desired, is available in Intel® 64 and IA-32 Architectures Software Developer's Manual Volume 2A: Instruction Set Reference, A-M, Order Number: 253666-032US, September 2009.

One or more embodiments include an article of manufacture that includes a tangible machine-accessible and/or machine-readable medium having stored thereon a rotate instruction that if executed by a machine (e.g., an execution unit or a processor) causes a data rotation operation and completes execution without reading a carry flag. The tangible medium may include one or more solid materials. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access, memory (RAM), static-RAM (SRAM), dynamic-RAM (DRAM), Flash memory, and combinations thereof.

Suitable machines include, but are not limited to, execution units, general-purpose processors, special-purpose processors (e.g., graphics processors and cryptographic processors), cryptographic accelerators, network communications processors, computer systems, network devices, modems, personal digital assistants (PDAs), cellular phones, and a wide variety of other electronic devices with one or more execution units, to name just a few examples.

Still other embodiments pertain to a computer system, embedded system, or other electronic device having an execution unit and/or performing a method as disclosed herein.

Figure 8:
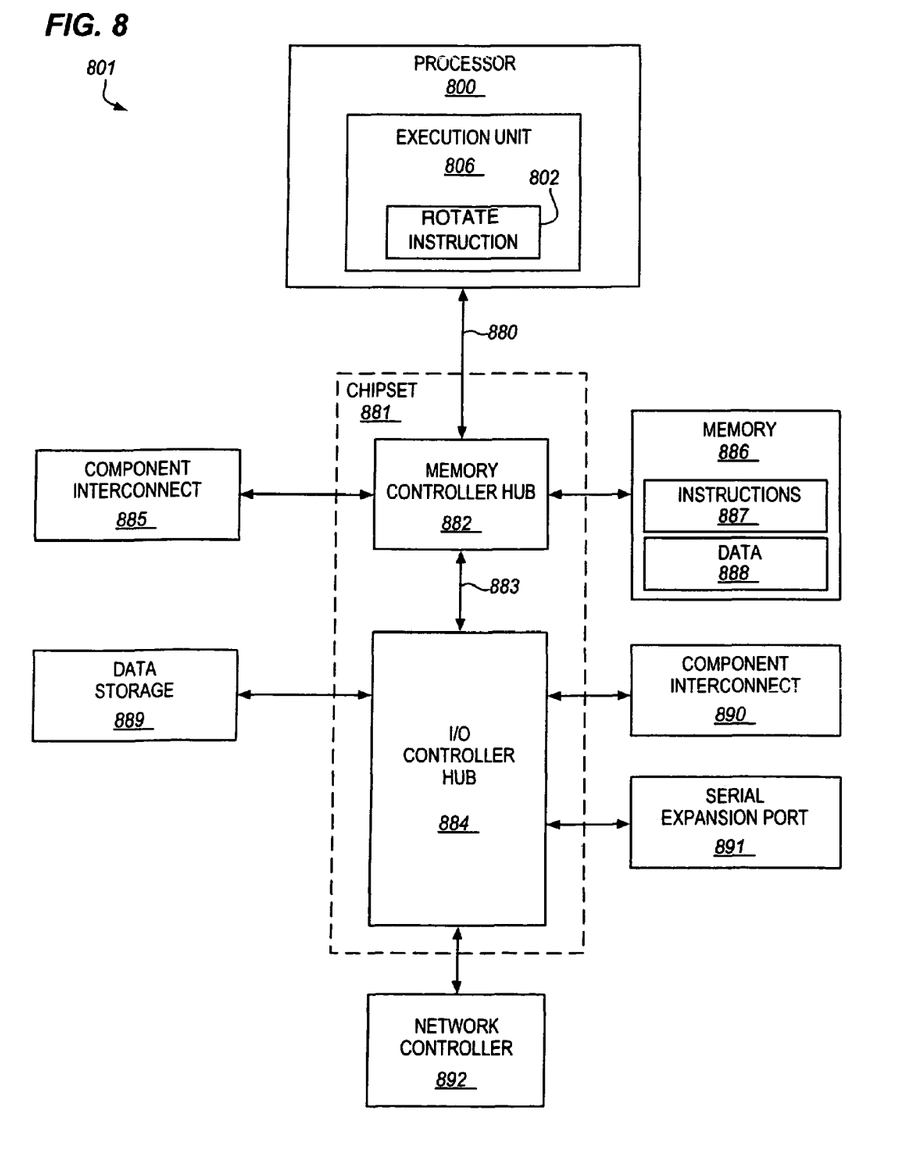
FIG. 8 is a block diagram of a first example embodiment of a suitable computer system.

FIG. 8 is a block diagram of a, first example embodiment of a suitable computer system 801. The computer system includes a processor 800. The processor includes at least one execution unit 806 that is capable of executing at least one rotate instruction 802.

The processor is coupled to a chipset 881 via a bus (e.g., a front side bus) or other interconnect 880. The interconnect may be used to transmit data signals between the processor and other components in the system via the chipset.

The chipset includes a system logic chip known as a memory controller hub (MCH) 882. The MCH is coupled to the front side bus or other interconnect 880.

A memory 886 is coupled to the MCH. In various embodiments, the memory may include a random access memory (RAM). DRAM is an example of a type of RAM used in some but not all computer systems. As shown, the memory may be used to store instructions 887, such as one or more rotate instructions, and data 888.

A component interconnect 885 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 884. The ICH is coupled to the MCH through hub interface bus or other interconnect 883. In one or more embodiments, the bus or other interconnect 883 may include a Direct Media Interface (DMI).

A data storage 889 is coupled to the ICH. In various embodiments, the data storage may include a hard disk drive, a floppy disk drive, a CD-ROM device, a flash memory device, or the like, or a combination thereof.

A second component interconnect 890 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 891 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 882 may be physically integrated on-die with the processor 800 and the processor may be directly coupled with a memory 886 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 9:
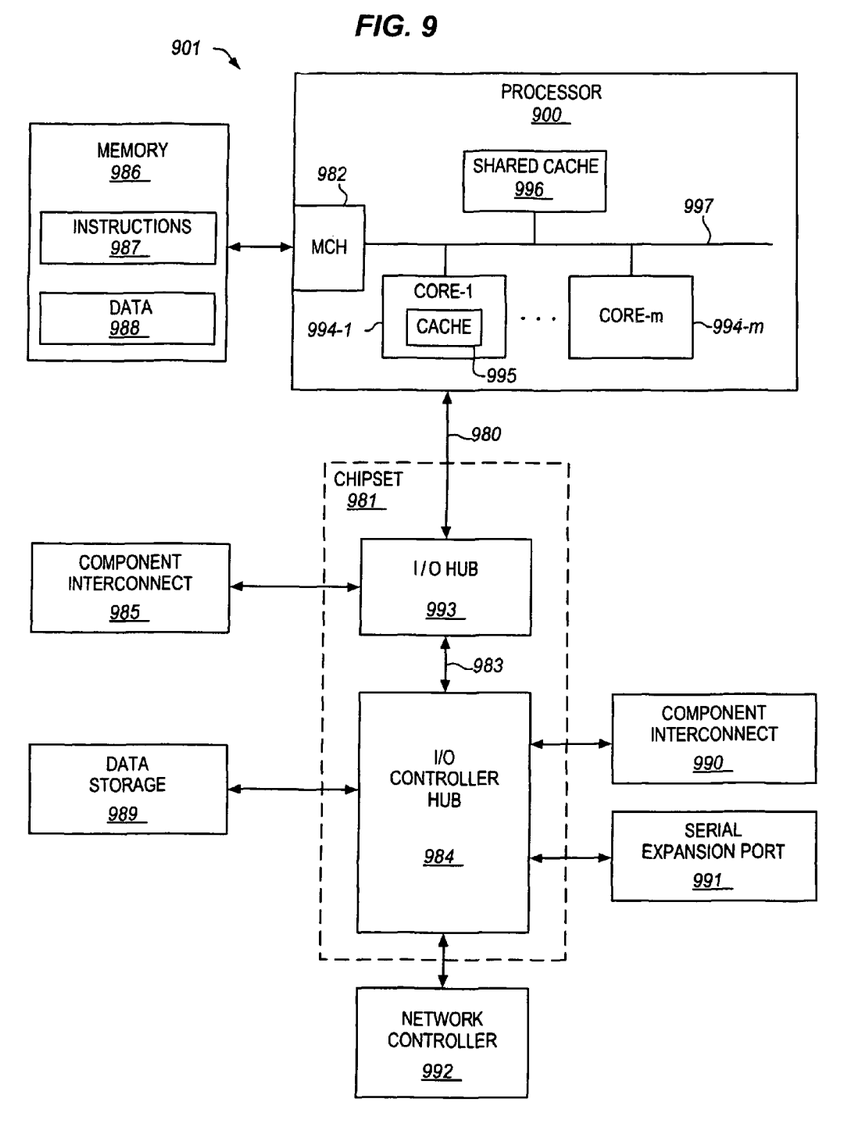
FIG. 9 is a block diagram of a second example embodiment of a suitable computer system.

FIG. 9 is a block diagram of a second example embodiment of a suitable computer system 901. The second example embodiment has certain similarities to the first example computer system described immediate above. For clarity, the discussion will tend to emphasize the differences without repeating all of the similarities.

Similar to the first example embodiment described above, the computer system includes a processor 900, and a chipset 981 having an I/O controller hub (ICH) 984. Also similarly to the first example embodiment, the computer system includes a first component interconnect 985 coupled with the chipset, a second component interconnect 990 coupled with the ICH, a serial expansion port 991 coupled with the ICH, a network controller 992 coupled with the ICH, and a data storage 989 coupled with the ICH.

In this second embodiment, the processor 900 is a multi-core processor. The multi-core processor includes processor cores 994-1 through 994-M, where M may be an integer number equal to or larger than two (e.g. two, four, seven, or more). Each core may include at least one execution unit that is capable of executing at least one embodiment of an instruction as disclosed herein. As shown, the core-1 includes a cache 995 (e.g., an L1 cache). Each of the other cores may similarly include a dedicated cache. The processor cores may be implemented on a single integrated circuit (IC) chip.

The processor also includes at least one shared cache 996. The shared cache may store data (e.g., instructions) that are utilized by one or more components of the processor, such as the cores. For example, the shared cache may locally cache data stored in a memory 986 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 997. The bus or other interconnect may couple the cores and the shared cache and allow communication.

The processor also includes a memory controller hub (MCH) 982. As shown in this example embodiment, the MCH is integrated with the processor 900. For example, the MCH may be on-die with the processor cores. The processor is coupled with the memory 986 through the MCH. In one or more embodiments, the memory may include DRAM, although this is not required.

The chipset includes an input/output (I/O) hub 993. The I/O hub is coupled with the processor through a bus (e.g., a QuickPath Interconnect (QPI)) or other interconnect 980. The first component interconnect 985 is coupled with the I/O hub 993.

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to a machine instruction or one or more control signals derived from the machine instruction to store an instruction specified result operand.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A system-on-chip (SoC) comprising:
   an on-die memory controller;
   an on-die graphics device;
   an on-die controller for a universal serial bus (USB) port; and
   an on-die multi-core processor comprising:
   at least four cores, wherein each of the at least four cores comprises:
   at least one level 1 (L1) cache;
   a register to store a plurality of flags, including a carry flag, a sign flag, a zero flag, and an overflow flag;
   at least sixteen 64-bit general-purpose registers, wherein the 64-bit general-purpose registers are operable to store 64-bit operands in a 64-bit mode and are operable to store 32-bit operands in a 32-bit mode, wherein the 32-bit operands are to be stored in a lower 32-bits of the 64-bit general-purpose registers;
   a branch prediction logic;
   an instruction fetch logic to fetch a rotate right instruction;
   a decoder to decode the rotate right instruction, wherein the rotate right instruction is to indicate a 64-bit operand size, a first 64-bit source operand, a second 64-bit source operand, and is to have a field to specify a first 64-bit general-purpose register;
   a register renaming logic to rename the 64-bit general-purpose registers;
   a re-order buffer; and
   a plurality of execution units, including a first execution unit to execute the rotate right instruction, wherein the rotate right instruction is to cause the first execution unit to rotate the first 64-bit source operand right by an amount that is to be indicated by the second 64-bit source operand, wherein bits rotated out of a least significant bit of the first 64-bit source operand are to be rotated into a most significant bit of the first 64-bit source operand, and to store a result that is to include the first 64-bit -bit source operand rotated right by the amount into the first 64-bit general-purpose register, and wherein the rotate right instruction is to complete without causing the carry flag to be read, without causing the carry flag to be written, without causing the sign flag to be written, without causing the zero flag to be written, and without causing the overflow flag to be written,
   wherein the processor comprises a reduced instruction set computing (RISC) processor.

2. The SoC of claim 1, wherein the processor further comprises a shared level 2 (L2) cache that is to be shared by the at least four cores.

3. The SoC of claim 1, wherein the rotate right instruction has at least one bit to specify the 64-bit operand size.

4. The SoC of claim 1, wherein the rotate right instruction is to complete without causing any arithmetic flags to be read and without causing said any arithmetic flags to be written.

5. The SoC of claim 1, wherein the rotate right instruction is to complete without causing any flags to be written.

6. A system-on-chip (SoC) comprising:
   an on-die memory controller;
   an on-die graphics device;

an on-die controller for a universal serial bus (USB) port; and an on-die multi-core processor comprising:
at least four cores, wherein each of the at least four cores comprises:
at least one level 1 (L1) cache;
a register to store a plurality of flags, including a carry flag, a sign flag, a zero flag, and an overflow flag;
at least sixteen 64-bit general-purpose registers, wherein the 64-bit general-purpose registers are operable to store 64-bit operands in a 64-bit mode and are operable to store 32-bit operands in a 32-bit mode, wherein the 32-bit operands are to be stored in a lower 32-bits of the 64-bit general-purpose registers;
a branch prediction logic;
an instruction fetch logic to fetch a rotate right instruction;
a decoder to decode the rotate right instruction, wherein the rotate right instruction is to indicate a 64-bit operand size, a first 64-bit source operand, a second 64-bit source operand, and is to have a field to specify a first 64-bit general-purpose register;
a register renaming logic to rename the 64-bit general-purpose registers;
a re-order buffer; and
a plurality of execution units, including a first execution unit to execute the rotate right instruction, wherein the rotate right instruction is to cause the first execution unit to rotate the first 64-bit source operand right by an amount that is to be indicated by the second 64-bit source operand, wherein bits rotated out of a least significant bit of the first 64-bit source operand are to be rotated into a most significant bit of the first 64-bit source operand, and to store a result that is to include the first 64-bit source operand rotated right by the amount into the first 64-bit general-purpose register, and wherein the rotate right instruction is to complete without causing the carry flag to be read, without causing the sign flag to be read, without causing the zero flag to be read, and without causing the overflow flag to be read,
wherein the processor comprises a reduced instruction set computing (RISC) processor.

7. The SoC of claim 6, wherein the processor further comprises a shared level 2 (L2) cache that is to be shared by the at least four cores.

8. The SoC of claim 6, wherein the rotate right instruction has at least one bit to specify the 64-bit operand size.

9. The SoC of claim 6, wherein the rotate right instruction is to complete without causing any flags to be written.

10. A system-on-chip (SoC) comprising:
an on-die memory controller;
an on-die graphics device;
an on-die controller for a universal serial bus (USB) port; and
an on-die multi-core processor comprising:
at least four cores, wherein each of the at least four cores comprises:
at least one level 1 (L1) cache;
a register to store a plurality of flags, including a carry flag, a sign flag, a zero flag, and an overflow flag;
at least sixteen 64-bit general-purpose registers, wherein the 64-bit general-purpose registers are operable to store 64-bit operands in a 64-bit mode and are operable to store 32-bit operands in a 32-bit mode, wherein the 32-bit operands are to be stored in a lower 32-bits of the 64-bit general-purpose registers;
a branch prediction logic;
an instruction fetch logic to fetch a first rotate right instruction;
a decoder to decode the first rotate right instruction and a second rotate right instruction, wherein the first rotate right instruction is to indicate a 64-bit operand size, a first 64-bit source operand, a second 64-bit source operand, and a first 64-bit general-purpose register;
a register renaming logic to rename the 64-bit general-purpose registers;
a re-order buffer; and
a plurality of execution units, including a first execution unit to execute the first rotate right instruction, wherein the first rotate right instruction is to cause the first execution unit to rotate the first 64-bit source operand right by an amount that is to be indicated by the second 64-bit source operand, wherein bits rotated out of a least significant bit of the first 64-bit source operand are to be rotated into a most significant bit of the first 64-bit source operand, and to store a result into the first 64-bit general-purpose register, and wherein the first rotate right instruction is to complete without causing the carry flag to be read, without causing the carry flag to be written, without causing the sign flag to be written, without causing the zero flag to be written, and without causing the overflow flag to be written, and wherein the second rotate right instruction when executed is to cause the carry flag to be read.

11. The SoC of claim 10, wherein the result is to include the first 64-bit source operand which is to have been rotated right by the amount.

12. The SoC of claim 10, wherein the processor comprises a reduced instruction set computing (RISC) processor.

13. The SoC of claim 10, wherein the first rotate right instruction has at least one bit to specify the 64-bit operand size.

14. The SoC of claim 10, wherein the first rotate right instruction is to complete without causing any arithmetic flags to be read and without causing said any arithmetic flags to be written.

15. The SoC of claim 10, wherein a speed of execution of the first rotate right instruction is to be greater than a speed of execution of the second rotate right instruction.

16. A system-on-chip (SoC) comprising:
an on-die memory controller;
an on-die graphics device;
an on-die controller for a universal serial bus (USB) port; and
an on-die multi-core processor comprising:
at least four cores, wherein each of the at least four cores comprises:
at least one level 1 (L1) cache;
a register to store a plurality of flags, including a carry flag, a sign flag, a zero flag, and an overflow flag;
at least sixteen 64-bit general-purpose registers, wherein the 64-bit general-purpose registers are operable to store 64-bit operands in a 64-bit mode and are operable to store 32-bit operands in a 32-bit mode, wherein the 32-bit operands are to be stored in a lower 32-bits of the 64-bit general-purpose registers;
a branch prediction logic;
an instruction fetch logic to fetch a first rotate right instruction;
a decoder to decode the first rotate right instruction and a second rotate right instruction, wherein the first rotate right instruction is to indicate a 64-bit operand size, a first 64-bit source operand, a second 64-bit source operand, and a first 64-bit general-purpose register;

a register renaming logic to rename the 64-bit general-purpose registers;

a re-order buffer; and a plurality of execution units, including a first execution unit to execute the first rotate right instruction, wherein the first rotate right instruction is to cause the first execution unit to rotate the first 64-bit source operand right by an amount that is to be indicated by the second 64-bit source operand, wherein bits rotated out of a least significant bit of the first 64-bit source operand are to be rotated into a most significant bit of the first 64-bit source operand, and to store a result into the first 64-bit general-purpose register, and wherein the first rotate right instruction is to complete without causing the carry flag to be read, without causing the sign flag to be read, without causing the zero flag to be read, and without causing the overflow flag to be read, and wherein the second rotate right instruction when executed is to cause the carry flag to be read.

17. The SoC of claim 16, wherein the first 64-bit source operand which is to have been rotated right by the amount is to be stored as the result.

18. The SoC of claim 16, wherein the processor comprises a reduced instruction set computing (RISC) processor.

19. The SoC of claim 16, wherein the first rotate right instruction has at least one bit to specify the 64-bit operand size.

20. The SoC of claim 16, wherein a speed of execution of the first rotate right instruction is to be greater than a speed of execution of the second rotate right instruction.

21. A system-on-chip (SoC) comprising:

an on-die memory controller;

an on-die graphics device;

an on-die controller for a universal serial bus (USB) port; and an on-die multi-core processor comprising:

at least four cores, wherein each of the at least four cores is a reduced instruction set computing (RISC) processor and comprises:

at least one level 1 (L1) cache;

a register to store a plurality of flags, including a carry flag, a sign flag, a zero flag, and an overflow flag;

at least sixteen 64-bit general-purpose registers, wherein the 64-bit general-purpose registers are operable to store 64-bit operands in a 64-bit mode and are operable to store 32-bit operands in a 32-bit mode, wherein the 32-bit operands are to be stored in a lower 32-bits of the 64-bit general-purpose registers;

a branch prediction logic;

an instruction fetch logic to fetch a first rotate right instruction;

a decoder to decode the first rotate right instruction and a second rotate right instruction, wherein the first rotate right instruction is to indicate a 64-bit operand size, a first 64-bit source operand, a second 64-bit source operand, and is to have a field to specify a first 64-bit general-purpose register, wherein the first rotate right instruction has at least one bit to specify the 64-bit operand size;

a register renaming logic to rename the 64-bit general-purpose registers;

a re-order buffer; and a plurality of execution units, including a first execution unit to execute the first rotate right instruction, wherein the first rotate right instruction is to cause the first execution unit to rotate the first 64-bit source operand right by an amount that is to be indicated by the second 64-bit source operand, wherein bits rotated out of a least significant bit of the first 64-bit source operand are to be rotated into a most significant bit of the first 64-bit source operand, and to store a result that is to include the first 64-bit source operand rotated right by the amount into the first 64-bit general-purpose register, and wherein the first rotate right instruction is to complete without causing the carry flag to be read and without causing the carry flag to be written, without causing the sign flag to be read and without causing the sign flag to be written, without causing the zero flag to be read and without causing the zero flag to be written, and without causing the overflow flag to be read and without causing the overflow flag to be written, and wherein the second rotate right instruction when executed is to cause the carry flag to be read.

22. The SoC of claim 21, wherein a speed of execution of the first rotate right instruction is to be greater than a speed of execution of the second rotate right instruction.

* * * * *